United States Patent
Kakinohana et al.

(10) Patent No.: US 7,946,111 B2
(45) Date of Patent: May 24, 2011

(54) APPARATUS AND METHOD FOR PM PURIFICATION

(75) Inventors: Masaru Kakinohana, Susono (JP); Hirohito Hirata, Suntou-gun (JP); Masaya Ibe, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 899 days.

(21) Appl. No.: 11/884,458

(22) PCT Filed: May 15, 2006

(86) PCT No.: PCT/JP2006/310080
§ 371 (c)(1),
(2), (4) Date: Aug. 16, 2007

(87) PCT Pub. No.: WO2006/123801
PCT Pub. Date: Nov. 23, 2006

(65) Prior Publication Data
US 2009/0205315 A1   Aug. 20, 2009

(30) Foreign Application Priority Data
May 18, 2005 (JP) .................... 2005-145294

(51) Int. Cl.
*B01D 53/94* (2006.01)
*B01J 35/04* (2006.01)
*F01N 3/02* (2006.01)
(52) U.S. Cl. ............ 60/295; 60/300; 422/177; 422/180; 422/186.04

(58) Field of Classification Search .............. 422/174, 422/177, 180, 186.04; 60/295, 300; 204/164
See application file for complete search history.

(56) References Cited

U.S. PATENT DOCUMENTS

| | | | | |
|---|---|---|---|---|
| 5,588,292 | A * | 12/1996 | Hiraishi et al. | ............ 60/300 |
| 6,558,637 | B2 * | 5/2003 | Tamura et al. | ........ 422/186.04 |
| 7,442,218 | B2 * | 10/2008 | Okubo et al. | ............ 55/282.3 |
| 7,510,600 | B2 * | 3/2009 | Ibe et al. | ................... 96/52 |
| 7,514,047 | B2 * | 4/2009 | Hirata et al. | ........ 422/186.04 |

FOREIGN PATENT DOCUMENTS
JP      A 2001-280121      10/2001
(Continued)

OTHER PUBLICATIONS
Machine Translation,Abstract, Detailed Description, Means JP 2005-106022, published date Apr. 21, 2005.*

*Primary Examiner* — N. Bhat
(74) *Attorney, Agent, or Firm* — Oliff & Berridge, PLC (57) ABSTRACT

An apparatus and a method for PM purification, where good PM purification performance can be achieved. The PM purification apparatus includes (a) a honeycomb support having an outer periphery-side region and an inner-side region, which carries a PM oxidation catalyst and in which the PM oxidation catalyst loading per unit volume of support in the outer periphery-side region is greater than the PM oxidation catalyst loading per unit volume of support in the inner-side region, (b) a center electrode passing through the center part of the honeycomb support and extending to the exhaust gas flow upstream side, and (c) an outer peripheral electrode disposed on the outer periphery of the honeycomb support and electrically insulated from the center electrode by the honeycomb support. The PM purification method can be performed using the PM purification apparatus.

9 Claims, 3 Drawing Sheets

FOREIGN PATENT DOCUMENTS

| | | |
|---|---|---|
| JP | A 2003-278524 | 10/2003 |
| JP | A 2004-19534 | 1/2004 |
| JP | A 2004-239257 | 8/2004 |
| JP | A 2004-251138 | 9/2004 |
| JP | A 2004-344719 | 12/2004 |
| JP | 2005-106022 * | 4/2005 |
| JP | A 2005-120987 | 5/2005 |

* cited by examiner

APPARATUS AND METHOD FOR PM PURIFICATION

The present application is the national phase of International Application No. PCT/JP2006/310080, filed May 15, 2006, and claims priority benefit of JP 2005-145294, filed May 18, 2005, the disclosure of which is incorporated herein by reference in its entirety.

TECHNICAL FIELD

The present invention relates to an apparatus and a method for the purification of particulate matter (hereinafter referred to as "PM") in exhaust gas from internal combustion engines and the like. More specifically, the present invention relates to a PM purification apparatus and a PM purification method for purifying PM exhausted from internal combustion engines, such as a diesel engine.

BACKGROUND ART

Many automobiles use diesel engines, particularly, large-size vehicles. In recent years, there is a strong demand to reduce the discharge of PM, as well as nitrogen oxide, carbon monoxide, hydrocarbon, etc., from the exhaust gas of a diesel engine. Therefore, not only development of a technique for reducing PM, for example, by improving engines or optimizing combustion conditions, but also establishing a technique for efficiently removing PM from exhaust gas, has been desired.

In order to remove PM from exhaust gas, a ceramic honeycomb filter, alloy filter and ceramic fiber filter are generally used. However, when PM is trapped in such a filter, oxidative removal of PM cannot be expected to be achieved by only the heat of the exhaust, resulting in the filter being clogged with trapped PM as operation time passes, giving rise to an increase in air-flow resistance, which places a load on the engine.

To solve this problem, regarding the oxidative removal of PM trapped in a filter, Japanese Unexamined Patent Publication (Kokai) No. 2001-280121 discloses a technique where a filter loaded thereon with a PM oxidation catalyst is used, an electric heating device is disposed upstream of this filter and when the oxidation of PM by the PM oxidation catalyst cannot be efficiently performed, the exhaust gas is heated by an electric heating device. This patent publication also discloses disposing an electrical discharge device upstream of the filter, and if desired, causing an electrical discharge to generate an oxidative gas such as nitrogen dioxide ($NO_2$).

Incidentally, in order to trap PM, it is known to electrically charge PM and promote PM trapping by using an electrostatic action. For example, Kokai No. 2004-19534 discloses a PM purification apparatus having an electrical discharge electrode and a honeycomb-shaped counter-electrode. When this PM purification apparatus is used, an electrical discharge is generated between these electrodes thereby electrically charging the PM and causing PM to accumulate on the honeycomb-shaped counter-electrode. This patent publication also discloses loading a PM oxidation catalyst on the honeycomb-shaped counter-electrode and promoting the oxidation of PM by a catalyst.

Furthermore, in order to promote trapping of PM by an electrostatic action, Kokai No. 2004-239257 discloses a PM purification apparatus where PM in an exhaust gas is electrically charged freely in advance and at the same time, an electric field that is non-parallel to the exhaust gas flow is created in a honeycomb support, thereby promoting the electrostatic PM trapping in the honeycomb support. This patent publication also discloses that a ceria ($CeO_2$)-based PM oxidation catalyst is trapped in the honeycomb support to promote the oxidation of PM by using the catalyst, and the air-flow resistance in the outer periphery-side of the honeycomb support is made larger than the air-flow resistance in the inner-side region of the honeycomb support.

In addition, in Kokai No. 2005-12098, there is in a problem that the flow rate of an exhaust gas passing through the center part of the filter is larger than the flow rate of an exhaust gas passing through the outer periphery side thereof and accordingly, the filter is readily clogged due to accumulation of PM in the center part of the filter. In order to solve such a problem, this patent publication discloses an exhaust gas purification apparatus where by trapping PM by an electrostatic action, a honeycomb support with a cell density that is gradually decreased from the central part toward the outer periphery side is used so that the flow rate of exhaust gas in the outer periphery side of the honeycomb support can be increased and PM can be uniformly accumulated in the entire honeycomb support. This patent publication also discloses loading a ceria ($CeO_2$)-based PM oxidation catalyst in the honeycomb support and promoting the oxidation of PM by using the catalyst.

In these PM purification apparatuses, good PM purification performance is achieved by using an electrostatic action for the PM trapping or by using a PM oxidation catalyst for the oxidative removal of PM. Accordingly, the present invention provides an apparatus and a method for PM purification, where these PM purification apparatuses are further improved.

DISCLOSURE OF THE INVENTION

The PM purification apparatus of the present invention comprises (a) a honeycomb support having an outer periphery-side and an inner-side, which carries a PM oxidation catalyst and in which the PM oxidation catalyst loading per unit volume of support in the outer periphery-side is larger than the PM oxidation catalyst loading per unit volume of support in the inner-side, (b) a center electrode passing through the central part of the honeycomb support and extending to the exhaust gas flow upstream side, and (c) an outer peripheral electrode disposed on the outer periphery of the honeycomb support and electrically insulated from the center electrode by the honeycomb support. Here, the PM oxidation catalyst may contain ceria or a ceria-containing composite metal oxide as a coat material.

According to the PM purification apparatus of the present invention, an electric field is created by applying voltage between the center electrode and the outer peripheral electrode, whereby PM in an exhaust gas is electrically charged and the electrically charged PM is moved to the outer periphery side of the exhaust gas flow path, and as a result, a relatively large amount of PM can be trapped in the outer periphery-side region of a honeycomb support disposed in the exhaust gas flow path. In the PM purification apparatus of the present invention, the PM oxidation catalyst loading per unit volume of support in the outer periphery-side region of the honeycomb support is larger than the PM oxidation catalyst loading per unit volume of support in the inner-side region of the honeycomb support, and therefore the PM oxidation in the outer periphery-side region of the honeycomb support, where the amount of PM trapped is relatively large, is higher than the PM oxidation ability in the inner-side region of the honeycomb support, where the amount of PM trapped is relatively small.

That is, according to the PM purification apparatus of the present invention, the PM oxidation catalyst loaded on the honeycomb support can be efficiently used.

In one embodiment of the PM purification apparatus of the present invention, the honeycomb support further carries an $NO_x$ purification catalyst and at the same time, the $NO_x$ purification catalyst loading per unit volume of support in the inner-side region is larger than the $NO_x$ purification catalyst loading per unit volume of support in the outer periphery-side region. Here, the $NO_x$ purification catalyst may contain, as a coat material, a metal oxide selected from the group consisting of alumina, zirconia, titania or a combination thereof.

In the center of an exhaust pipe, the flow velocity of exhaust gas is greater than the outer periphery side of the exhaust tube, and the amount of $NO_x$ to be treated increases. Therefore, according to the embodiment above, the $NO_x$ purification catalyst loaded on the honeycomb support can be efficiently used.

Also, in the PM purification apparatus of the present invention, since the PM oxidation catalyst loading per unit volume of support in the outer periphery-side region of the honeycomb support is greater than the PM oxidation catalyst loading per unit volume of support in the inner-side region of the honeycomb support, according to the embodiment above, PM oxidation performance can be enhanced by increasing the ratio of the PM oxidation catalyst in the outer periphery-side region where PM is trapped in a large amount, and at the same time, $NO_x$ purification performance can be enhanced by increasing the ratio of the $NO_x$ purification catalyst in the inner-side region where a large amount of $NO_x$ to be treated flows in, which achieves both PM oxidative removal and $NO_x$ purification.

In one embodiment of the PM purification apparatus of the present invention, the outer periphery-side region of the honeycomb support is made of an electrically conducting material and the inner-side region of the honeycomb support is made of an insulating material.

According to this embodiment, the outer periphery-side region of the honeycomb support, where PM is accumulated in a large amount, is made of an electrically conducting material, particularly a metal, so that when electrically charged PM is trapped, the electrical charge of PM can be swiftly removed. This prevents any accumulated PM from electrostatically repelling each other and coming off. Also, the inner-side region of the honeycomb support is made of an insulating material, so that electrical insulation between the outer peripheral electrode and the center electrode can be maintained.

In one embodiment of the PM purification apparatus of the present invention, the air-flow resistance in the outer periphery-side region of the honeycomb support is larger than the air-flow resistance in the inner-side region of the honeycomb support.

According to this embodiment, the exhaust gas fed to the honeycomb support flows toward the inner-side region of the honeycomb support, where air-flow resistance is relatively small, and in turn, comes close to the center electrode extending to the exhaust gas flow upstream side of the honeycomb support. Since the density of the electric field is great in the vicinity of the center electrode, PM that is electrically charged and moves toward the outer periphery direction, PM can be trapped in the outer periphery-side region of the honeycomb support.

In the method of the present invention for purifying PM in an exhaust gas, a honeycomb support having an outer periphery-side region and an inner-side region, which carries a PM oxidation catalyst and in which the PM oxidation catalyst loading per unit volume of support in the outer periphery-side region is greater than the PM oxidation catalyst loading per unit volume of support in the inner-side region, is used. This method comprises (a) electrically charging PM in an exhaust gas, (b) creating a radius-direction electric field in an exhaust gas flow path, (c) moving the electrically charged PM to the outer periphery side of the exhaust gas flow path by the radius-direction electric field, and (d) trapping the PM moved to the outer periphery side of the exhaust gas flow path, in the outer periphery-side region of the honeycomb support disposed in the exhaust gas flow path.

According to the PM purification method of the present invention, PM is mainly trapped in the outer periphery-side region of the honeycomb support. In the honeycomb support for use in this method, the PM oxidation catalyst loading per unit volume of support in the outer periphery-side region is greater than the PM oxidation catalyst loading per unit volume of support in the inner-side region, and therefore PM oxidation in the outer periphery-side region where the amount of PM trapped is relatively large, is greater than the PM oxidation in the inner-side region where the amount of PM trapped is relatively small.

That is, according to the method of the present invention, the PM oxidation catalyst loaded in the honeycomb support can be effectively used.

Incidentally, for the PM purification method of the present invention, the constituent elements described regarding the PM purification apparatus of the present invention, that is, the honeycomb support, the catalyst, the electrode, the high-voltage power source and the like, can be used.

BRIEF DESCRIPTION OF THE DRAWINGS

FIG. 1b is a cross-sectional view showing the PM purification apparatus of the present invention shown in FIG. 1a.

BEST MODE FOR CARRYING OUT THE INVENTION

The present invention is described in detail below based on the embodiments shown in the drawings, but these drawings illustrate by way of examples the PM purification apparatus of the present invention, and the present invention is not limited to these embodiments.

Figure 1A:
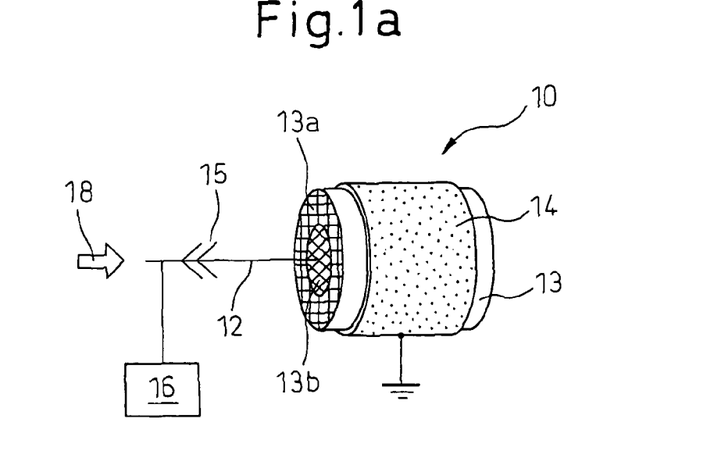
FIG. 1a is a perspective view showing one embodiment of the PM purification apparatus of the present invention.
Figure 1B:
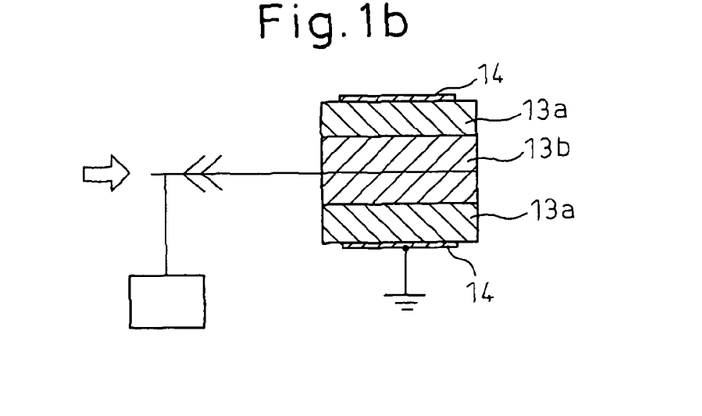

One embodiment of the PM purification apparatus of the present invention is described by referring to FIGS. 1a and 1b. Here, FIGS. 1a and 1b are respectively a perspective view and a cross-sectional view of the PM purification apparatus.

As shown in FIGS. 1a and 1b, the PM purification apparatus 10 of the present invention comprises a honeycomb support 13, a center electrode 12 and an outer peripheral electrode 14. The honeycomb support 13 shown has an outer periphery-side region 13a and an inner-side region 13b. Also, this honeycomb support 13 carries a PM oxidation catalyst, and the PM oxidation catalyst loading per unit volume of support in the outer periphery-side region 13a is greater than the PM oxidation catalyst loading per unit volume of support in the inner-side region 13b.

The center electrode 12 passes through the center part of the honeycomb support 13 and extends to the exhaust gas flow upstream side. Furthermore, the outer peripheral electrode 14 is cylindrically disposed on the outer periphery of the honeycomb support 13 and electrically insulated from the center electrode 12 by the honeycomb support 13. PM-containing exhaust gas flows from the left to the right of the figure as shown by arrow 18 and passes through each flow path (cell) in the honeycomb support 13 surrounded by the outer peripheral electrode 14.

In the PM purification apparatus 10 shown in FIGS. 1a and 1b, the center electrode 12 and the outer peripheral electrode 14 are connected to a power source 16 and ground, respectively, and coupled. Also, the center electrode 12 has a needle-like electrode 15 on the exhaust gas flow upstream side of the honeycomb support 13, and electrical discharging between the needle-like electrode 15 and the outer peripheral electrode 14 and electrical charging of PM is thereby promoted.

When using the PM purification apparatus 10 shown in FIGS. 1a and 1b, the power source 16 is energized, whereby an electrical discharge is generated between the portion (particularly the needle-like electrode 15) extending to the exhaust gas flow upstream side of the center electrode 12 and the outer peripheral electrode 14 and PM in the exhaust gas is electrically charged. The PM electrically charged in this way is moved to the outer periphery side of the exhaust gas flow path by an electric field between the portion extending to the exhaust gas flow upstream side of the center electrode 12 and the outer peripheral electrode 14 and is trapped in the outer periphery-side region 13a of the honeycomb support 13 disposed in the exhaust gas flow path.

Particularly, in the PM purification apparatus 10 shown in FIGS. 1a and 1b, an electric field non-parallel to the exhaust gas flow is also formed in the honeycomb support 13 between the center electrode 12 and the outer peripheral electrode 14. The thus-formed electric field presses the electrically charged PM against the cell wall of the honeycomb support 13 and promotes PM trapping by the honeycomb support 13.

The parts constituting the PM purification apparatus of the present invention shown in FIGS. 1a and 1b are described in detail below.
<Honeycomb Support>

The honeycomb support for use in the present invention may be either a straight flow type or a wall flow type, but in view of air-flow resistance, a straight flow type is preferred. In order to trap PM, a so-called filter is generally used, that is a wall flow-type honeycomb support, but in the case of trapping PM by an electrostatic action, good trapping efficiency can also be achieved by the use of a straight flow-type honeycomb support.

The "outer periphery-side region" and "inner-side region" of the honeycomb support each can be arbitrarily set. Also, the "PM oxidation (or $NO_x$ purification) catalyst loading per unit volume of support in the outer periphery-side (or inner-side) region" indicates PM oxidation (or $NO_x$ purification) catalyst loading per unit volume of support assuming that the "outer periphery-side (or inner-side) region" of the honeycomb support is the entirety.

The honeycomb support may be formed of a material enabling insulation between the center electrode and the outer peripheral electrode, for example, a ceramic honeycomb support such as a cordierite honeycomb support may be used. Also, a part of the honeycomb support, particularly the outer periphery-side region, may be made of an electrically conducting material, for example, a metal. In the case where the outer periphery-side region of the honeycomb support is made of a metal, the inner-side region of the honeycomb support is preferably made of an insulating material. In this case, a honeycomb support made of an insulating material having a columnar shape is inserted into the inside of a honeycomb support made of an electrically conducting material having a cylindrical shape, and these are fixed, whereby the honeycomb support for use in the present invention can be formed.

The air-flow resistance of the honeycomb support depends on whether the honeycomb support is a straight flow type or a wall flow type, and the air-flow resistance of a straight flow-type honeycomb support is generally smaller than that of a wall flow-type honeycomb support. Also, the air-flow resistance of the honeycomb support greatly depends on the cell density of the honeycomb support, that is, the size of the individual cells of the honeycomb support. Generally, as the cell density is larger, that is, as the size of individual cells is smaller, air-flow resistance becomes greater.

Accordingly, in order to make the air-flow resistance in the outer periphery-side region of the honeycomb support greater than the air-flow resistance in the inner-side region of the honeycomb support, this can be achieved, for example, by using a wall flow-type honeycomb support for the outer periphery-side region and using a straight flow-type honeycomb support for the inner-side region; by increasing the cell density of the honeycomb support in the outer periphery-side region to be greater than the cell density of the honeycomb support in the inner-side region; or by a combination thereof.
<Catalyst>
PM Oxidation Catalyst:

The PM oxidation catalyst for use in the present invention is a catalyst for directly oxidizing PM with oxygen in the exhaust gas. This PM oxidation catalyst preferably contains, as a coat material, a material capable of releasing active oxygen and thereby promoting the oxidative removal of PM, such as ceria or a ceria-containing composite metal oxide. The "coat material" as used herein indicates a material forming a catalyst layer in the exhaust gas flow path of the honeycomb support.

In the case where the PM oxidation catalyst contains ceria or a composite oxide thereof as a coat material, a material selected from the group consisting of zirconium, lanthanum, yttrium, barium and praseodymium is solid-solubilized in the coat material, whereby the ceria-containing coat material can be promoted to release active oxygen. Also, in the PM oxidation catalyst for use in the present invention, a material selected from the group consisting of Pt, Fe, Ag, Mn, Cu, Ni, Co, K, Li, Ba, Cs, Ca and Sr can be loaded in the coat material to promote the oxidative removal of PM.

The PM oxidation catalyst include, particularly, a catalyst where the coat material contains ceria and carries copper, manganese, nickel, platinum and/or iron. As for the PM oxidation catalyst, a molten salt catalyst such as molybdenum oxide and vanadium oxide also may be used.
$NO_x$ Purification Catalyst:

The $NO_x$ purification catalyst usable in the present invention may be a catalyst called as an $NO_x$ storage reduction catalyst or an $NO_x$ selective reduction catalyst.

The $NO_x$ storage reduction catalyst is a catalyst for storing $NO_x$ when the air-fuel ratio is lean and reducing the stored $NO_x$ to $N_2$ when a rich spike is performed at regular intervals (the exhaust gas becomes fuel-rich). This is a catalyst obtained by loading at least one kind of a metal selected from the group consisting of a noble metal such as platinum, palladium and rhodium, an alkali metal and an alkaline earth metal, on a coat material formed of a metal oxide such as alumina, zirconia or titania. Incidentally, in this $NO_x$ storage reduction catalyst, ceria may be used as the coat material, but in this case, in order to prevent HC necessary for the reduction of $NO_x$ from being directly oxidized with oxygen and thereby consumed, the ceria is preferably calcined in advance at a high temperature, for example, 500° C. or more, to decrease its oxygen storage ability. As for the alkali metal or alkaline earth metal loaded on the $NO_x$ storage reduction catalyst, a combination of barium, potassium and lithium is preferably used in view of durability of the catalyst and the temperature of the $NO_x$ purification rate.

The $NO_x$ selective reduction catalyst is a catalyst of selectively reacting $NO_x$ with a reduction component in a lean atmosphere, thereby effecting purification, and can be obtained, for example, by loading at least one member selected from the group consisting of copper, cobalt, nickel, iron, gallium, lanthanum, cerium, zinc, titanium, calcium, barium and silver, and/or at least one noble metal selected from the group consisting of platinum, iridium, palladium and rhodium, on a coat material containing zeolite or alumina.

The PM oxidation catalyst and $NO_x$ purification catalyst can be loaded on the honeycomb support by using a known method, such as wash coating. The amount of the catalyst loaded on the honeycomb support can be arbitrarily selected within the range in which the catalyst can be loaded. In the case of loading the catalyst by wash coating on the exhaust gas flow path surface of the honeycomb support, the honeycomb support is thereafter preferably dried and calcined. As for the conditions at the calcination, conditions known to one skilled in the art may be employed, but calcination at 450 to 550° C. may be performed.

<Electrode>

The center electrode, outer peripheral electrode and an arbitrary needle-like electrode as a part of the center part can be produced from a material allowing for application of voltage between these electrodes. The material may be an electrically conducting material or a material such as a semiconductor, but a metal is generally preferred. Specific examples of metal which can be used include copper, tungsten, stainless steel, iron, platinum and aluminum, with stainless steel being preferred in view of cost and durability.

The center electrode usable in the present invention is generally a metallic wire or a bar-like body, but a hollow electrode can also be used. The outer peripheral electrode can be formed by winding such a material in the form of a metal mesh or a metal foil around the honeycomb support. A container holding the honeycomb support may also be used as the outer peripheral electrode. Furthermore, similarly to the center electrode, the outer peripheral electrode may extend to the exhaust gas flow upstream side of the honeycomb support. In this case, PM can be promoted to be electrically charged and move toward the outer peripheral direction, on the exhaust gas flow upstream side of the honeycomb support.

The needle-like electrode, which may be present in a portion of the center electrode on the exhaust gas flow upstream side, is preferably disposed by directing the tip of the needle-like part toward the outer peripheral electrode. Such a needle-like electrode promotes electrical discharging with the outer peripheral electrode. If the number of needle-like parts of the needle-like electrode is small, uniform electrical discharging with the outer peripheral electrode is difficult to generate. Therefore, the needle-like electrode preferably does not have less than a certain number of needle-like parts. However, in order to allow PM in the exhaust gas to successfully achieve electrical charging and movement toward the outer peripheral direction, an optimal number of needle-like parts can be experimentally determined.

<Power Source>

The power source may be a power source for generating pulsed or continuous DC or AC voltage. In general, for electrostatically moving the electrically charged PM, continuous DC voltage is preferably used, but in order to promote the activation of gas, it is sometimes preferable to generate a corona discharge by using a pulse voltage. Accordingly, a pulse voltage, AC voltage or a combination thereof may be used depending on the PM content in exhaust gas, the electrical charging degree of PM, the intended purification degree, and the like. A combination use of DC voltage and pulse voltage or AC voltage is also preferred.

The present invention is described below by referring to Examples, but the present invention is not limited thereto.

EXAMPLES

Examples and Comparative Examples were performed using a PM purification apparatus having a construction shown in FIGS. 1a and 1b. However, a needle-like electrode was not used here.

Example 1

Honeycomb Support

Figure 2:
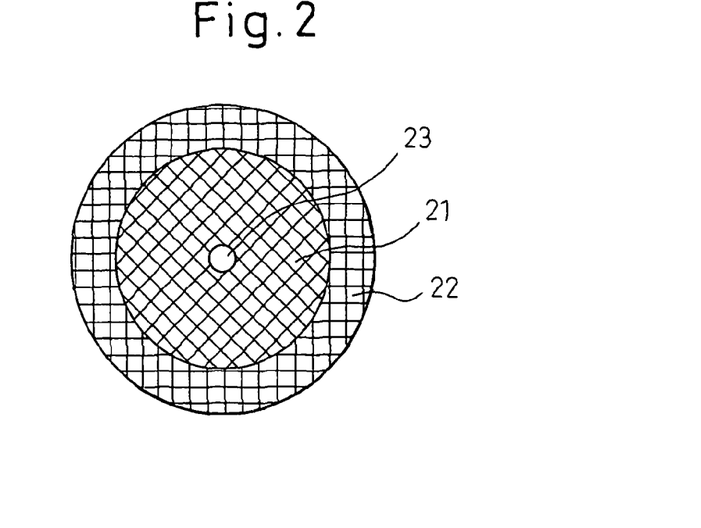
FIG. 2 is a cross-sectional view showing the honeycomb support used in Examples and Comparative Examples.

The honeycomb support used in Example 1 is a straight flow-type honeycomb support having a columnar shape like the honeycomb support 13 shown in FIGS. 1a and 1b. The honeycomb support of Example 1 has a cross-sectional shape shown in FIG. 2 and is formed by combining a columnar honeycomb support 21 for inner-side region and a cylindrical honeycomb support 22 of the outer periphery-side region. Here, the columnar honeycomb support 21 of the inner-side region was 82.5 mm (diameter)×155 mm (length) and had, on the center axis, a 20 mm-diameter through-hole 23 for passing a center electrode. The cylindrical honeycomb support 22 of the outer periphery-side region was 103 mm (outer diameter)×155 mm (length) and was shaped into a cylindrical form for housing the columnar honeycomb support 21 of the inner-side region. These honeycomb supports of the inner-side region and outer periphery-side region both were made of cordierite and had a cell density of 900 cpsi (cell/square inch).

Catalyst:

A catalyst prepared by loading potassium (K) on a ceria ($CeO_2$) powder was used as the PM oxidation catalyst. The potassium loading was 0.2 mol per 100 g of ceria. Also, a catalyst prepared by loading barium (Ba) and platinum (Pt) on an alumina ($Al_2O_3$) powder was used as the $NO_x$ purification catalyst. The barium loading was 0.1 mol per 100 g of alumina and the platinum loading was 0.75 g per 100 g of alumina.

A catalyst obtained by mixing the PM oxidation catalyst and the $NO_x$ purification catalyst at a ratio of 3:1 (by mass) was coated on the honeycomb support of the outer periphery-side region in an amount of 200 g/L-support. Also, a catalyst obtained by mixing the PM oxidation catalyst and the $NO_x$ purification catalyst at a ratio of 1:3 (by mass) was coated on the honeycomb support for inner-side region in an amount of 200 g/L-support. Accordingly, the PM oxidation catalyst loading per unit volume of support was 150 g/L-support in the honeycomb support of the outer periphery-side region and 50 g/L-support in the honeycomb support of the inner-side region. Also, the $NO_x$ purification catalyst loading was 50 g/L-support in the honeycomb support of the outer periphery-side region and 150 g/L-support in the honeycomb support of the inner-side region.

Electrode:

The center electrode and outer peripheral electrode were each formed using stainless steel.

Example 2

The PM purification apparatus of Example 2 was produced in the same manner as the PM purification apparatus of Example 1, except that the honeycomb support of the outer periphery-side region was made of a metal. Accordingly, similarly to the PM purification apparatus of Example 1, the honeycomb support of the inner-side region was made of cordierite and both honeycomb supports had a cell density of 900 cpsi.

Example 3

The PM purification apparatus of Example 3 was produced in the same manner as the PM purification apparatus of Example 1, except that the honeycomb support of the outer periphery-side region was a metal honeycomb support having a cell density of 900 cpsi and the honeycomb support for inner-side region was a cordierite honeycomb support having a cell density of 400 cpsi.

Comparative Example

The PM purification apparatus of the Comparative Example was produced in the same manner as the PM purification apparatus of Example 1, except that a catalyst prepared by mixing the PM oxidation catalyst and the $NO_x$ purification catalyst at a ratio of 1:1 (by mass) was coated on the honeycomb support in an amount giving a coverage of 200 g/L-support. Accordingly, in both the honeycomb support of the outer periphery-side region and the honeycomb support of the inner-side region, the PM oxidation catalyst loading and the $NO_x$ purification loading, per unit volume of support was each 100 g/L-support.

[Test Methods]

A diesel engine having a displacement of 2.2 L was steadily driven at an engine speed of 2,400 rpm, a torque of 80 Nm, and the exhaust gas from this engine was supplied to the PM purification apparatus of each of Examples 1 to 3 and the Comparative Example. Also, DC voltage of 30 kV was applied between the center electrode and the outer peripheral electrode.

Figure 3:
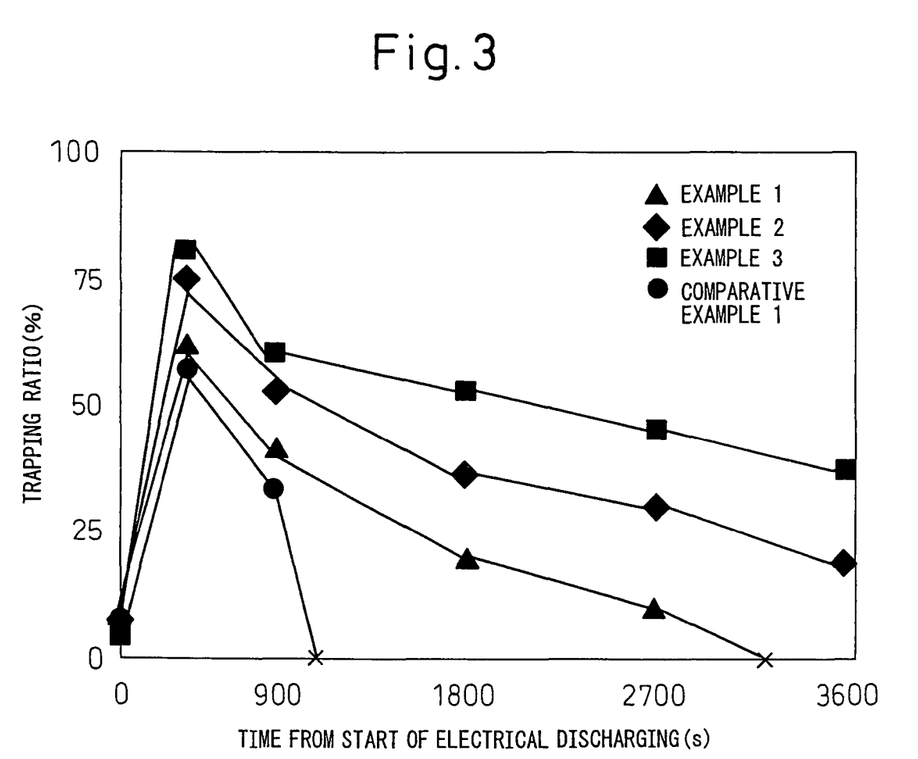
FIG. 3 is a graph showing the evaluation results of the PM purification apparatuses in Examples and Comparative Examples regarding the PM trapping ratio.

PM Trapping Performance:

The PM trapping performance of the PM purification apparatus was determined by flowing the inlet gas and outlet gas of the PM purification apparatus through a full dilution tunnel, trapping PM by a quartz filter, and analyzing the amount of PM trapped. FIG. 3 shows the results.

Figure 4:
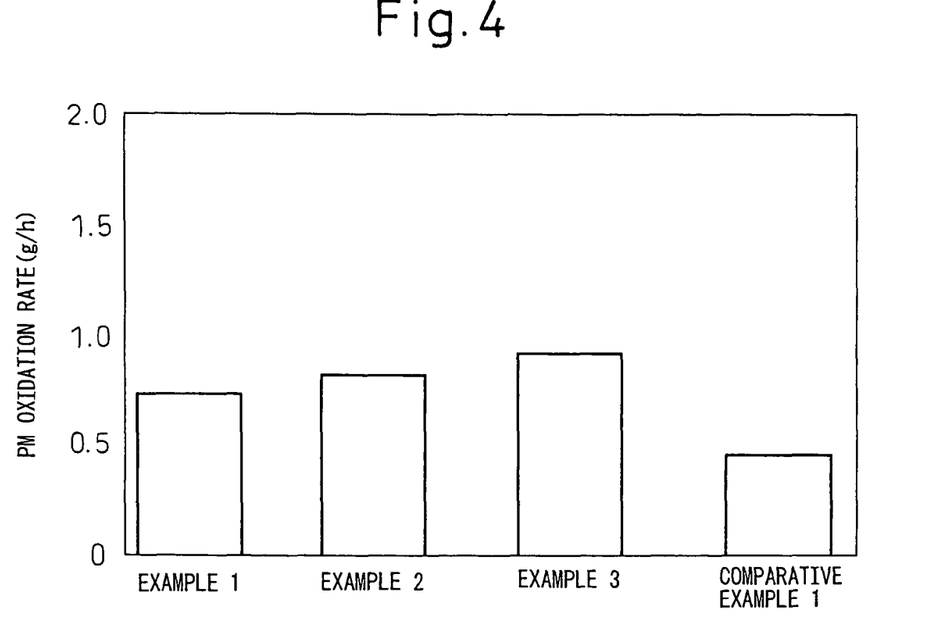
FIG. 4 is a graph showing the evaluation results of the PM purification apparatuses in Examples and Comparative Examples regarding the PM oxidation rate.

PM Oxidation Performance:

As for the PM oxidation performance of the PM purification apparatus, the weight of PM oxidized per hour was determined from the trapped amount of PM determined above and the change of weight of the honeycomb support before and after the test. FIG. 4 shows the results.

Figure 5:
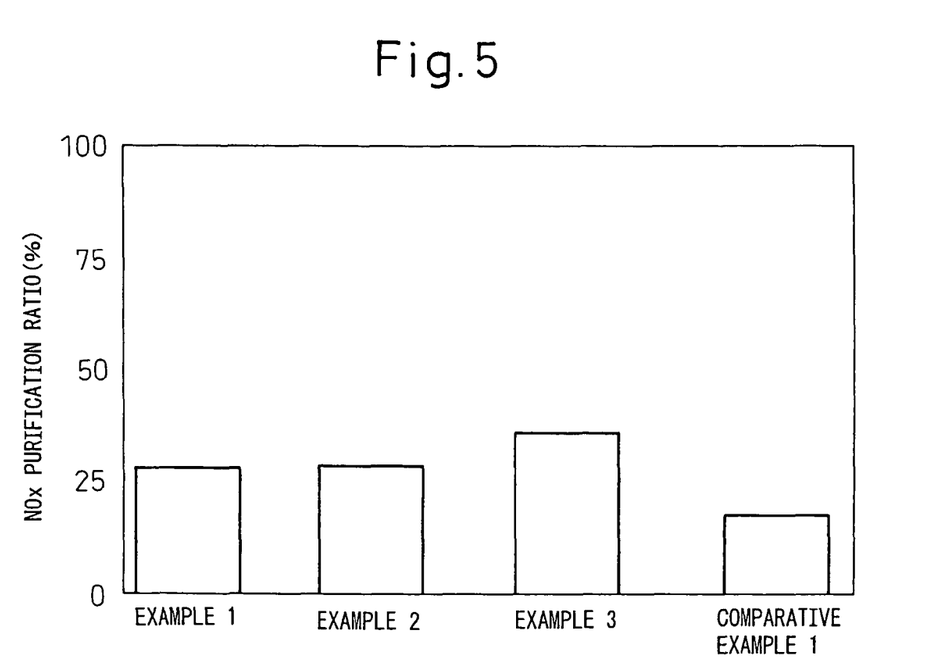
FIG. 5 is a graph showing the evaluation results of the PM purification apparatuses in Examples and Comparative Examples regarding the NOx purification ratio.

$NO_x$ Purification Performance:

The $NO_x$ purification ratio for 30 minutes after applying voltage to the PM purification apparatus, that is, after starting electrical discharging was determined. FIG. 5 shows the results.

[Evaluation Results]

PM Trapping Ratio:

According to the results of the PM trapping ratio shown in FIG. 3, in the PM purification apparatus of the Comparative Example, PM trapping was impossible under 1,000 seconds from the start of electrical discharging. This is because the oxidative removal of PM did not proceed satisfactorily in the honeycomb support, particularly in the outer periphery-side region of the honeycomb support, where PM is trapped in a relatively large amount, and the center electrode and the outer peripheral electrode were shorted through PM with the passing of time. On the other hand, in the PM purification apparatuses of Examples 1 to 3, PM trapping was achieved over a relatively long period of time. This is because the loading and concentration of the PM oxidation catalyst were high in the outer periphery-side region of the honeycomb support, where PM is trapped in a relatively large amount, and PM was thereby efficiently oxidized and removed.

Also, as shown in FIG. 3, out of Examples 1 to 3, an excellent PM trapping ratio was achieved particularly in Examples 2 and 3 using a metal honeycomb support as the honeycomb support of the outer periphery-side region. This is because the outer periphery-side region where PM is trapped in a relatively large amount was electrically conducting to enabling rapid removal of the electrical charge of trapped PM and PM was thereby prevented from coming off or dropping out due to an electrostatic repulsion force of the electrically charged PM from each other.

Furthermore, as shown in FIG. 3, the PM trapping ratio of the PM purification apparatus of Example 3 is higher than the PM trapping ratio of the PM purification apparatus of Example 2. This is because in the PM purification apparatus of Example 3 using a honeycomb support with the air-flow resistance of the inner-side region being smaller than the air-flow resistance of the outer periphery-side region, for example, electrical charging of PM was promoted on the exhaust gas flow upstream side of the honeycomb support.

PM Oxidation Rate:

According to the evaluation results of the PM oxidation rate shown in FIG. 4, the PM purification apparatuses of Examples 1 to 3 exhibit an excellent PM oxidation rate compared with the PM purification apparatus of the Comparative Example. This is because in the PM purification apparatuses of Examples 1 to 3, the loading or density of the PM oxidation catalyst was greater in the outer periphery-side region of the honeycomb support, where PM is trapped in a relatively large amount, and the oxidative removal of PM was thereby efficiently achieved.

$NO_x$ Purification Ratio:

According to the evaluation results of the $NO_x$ purification ratio shown in FIG. 5, the PM purification apparatuses of Examples 1 to 3 exhibit an excellent $NO_x$ purification ratio compared with the PM purification apparatus of the Comparative Example. This is because in the PM purification apparatuses of Examples 1 to 3, the loading or density of the $NO_x$ purification catalyst was greater in the inner-side region where the exhaust gas flows in a relatively large amount, and purification of $NO_x$ was thereby efficiently achieved.

Also, as shown in FIG. 5, in the PM purification apparatus of Example 3, an excellent $NO_x$ purification ratio is achieved compared with the PM purification apparatuses of Examples 1 and 2. This is because in the PM purification apparatus of Example 3, the air-flow resistance in the inner-side region of the honeycomb support was smaller than the air-flow resistance in the outer periphery-side region and therefore, a relatively large amount of an exhaust gas, that is, $NO_x$ flowed into the inner-side region having a high loading or density of the $NO_x$ purification catalyst.

The invention claimed is:

1. A PM purification apparatus comprising:
   (a) a honeycomb support having an outer periphery-side region and an inner-side region, which carries a PM oxidation catalyst and in which the PM oxidation catalyst loading per unit volume of support in said outer periphery-side region is greater than the PM oxidation catalyst loading per unit volume of support in said inner-side region,
   (b) a center electrode passing through the center part of said honeycomb support and extending to the exhaust gas flow upstream side, and
   (c) an outer peripheral electrode disposed on the outer periphery of said honeycomb support and electrically insulated from said center electrode by said honeycomb support.

2. The PM purification apparatus as claimed in claim 1, wherein said PM oxidation catalyst comprises ceria or a ceria-containing composite metal oxide as a coat material.

3. The PM purification apparatus as claimed in claim 1, wherein said honeycomb support further carries an $NO_x$ purification catalyst and the $NO_x$ purification catalyst loading per unit volume of support in said inner-side region is greater than the $NO_x$ purification catalyst loading per unit volume of support in said outer periphery-side region.

4. The PM purification apparatus as claimed in claim 1, wherein the outer periphery-side region of said honeycomb support is made of an electrically conducting material and the inner-side region of said honeycomb support is made of an insulating material.

5. The PM purification apparatus as claimed in claim 1, wherein said honeycomb support is a straight flow-type honeycomb support.

6. The PM purification apparatus as claimed in claim 1, wherein the air-flow resistance in the outer periphery-side region of said honeycomb support is larger than the air-flow resistance in the inner-side region of said honeycomb support.

7. The PM purification apparatus as claimed in claim 6, wherein the outer periphery-side region of said honeycomb support is a wall flow-type honeycomb support and the inner-side region of said honeycomb support is a straight flow-type honeycomb support.

8. The PM purification apparatus as claimed in claim 6, wherein the cell density in the outer periphery-side region of said honeycomb support is greater than the cell density in the inner-side region of said honeycomb support.

9. A method for purifying PM in an exhaust gas by using a honeycomb support having an outer periphery-side region and an inner-side region, which carries a PM oxidation catalyst and in which the PM oxidation catalyst loading per unit volume of support in said outer periphery-side region is greater than the PM oxidation catalyst loading per unit volume of support in said inner-side region, said PM purification method comprising:
   (a) electrically charging PM in an exhaust gas,
   (b) creating a radius-direction electric field in an exhaust gas flow path,
   (c) moving said electrically charged PM to the outer periphery side of the exhaust gas flow path by the radius-direction electric field, and
   (d) trapping said PM moved to the outer periphery side of the exhaust gas flow path, in the outer periphery-side region of said honeycomb support disposed in the exhaust gas flow path.

* * * * *